United States Patent
Park et al.

(10) Patent No.: US 9,338,235 B2
(45) Date of Patent: May 10, 2016

(54) METHOD FOR PROVIDING IN-VEHICLE NOTIFICATION SERVICE, MACHINE-READABLE STORAGE MEDIUM, HEAD UNIT DEVICE, AND MOBILE DEVICE

(71) Applicant: Samsung Electronics Co., Ltd., Gyeonggi-do (KR)

(72) Inventors: Ho-Yeon Park, Seoul (KR); Sung-Jin Lee, Suwon-si (KR); Wuk Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 43 days.

(21) Appl. No.: 13/630,621

(22) Filed: Sep. 28, 2012

(65) Prior Publication Data
US 2013/0086518 A1   Apr. 4, 2013

(30) Foreign Application Priority Data

Sep. 29, 2011   (KR) .................. 10-2011-0099100
Oct. 5, 2011    (KR) .................. 10-2011-0101487
Oct. 11, 2011   (KR) .................. 10-2011-0103833

(51) Int. Cl.
| | |
|---|---|
| G06F 3/048 | (2013.01) |
| H04L 29/08 | (2006.01) |
| H04W 4/04 | (2009.01) |
| H04W 4/20 | (2009.01) |
| H04L 29/06 | (2006.01) |

(52) U.S. Cl.
CPC .............. *H04L 67/12* (2013.01); *G06F 3/048* (2013.01); *H04W 4/046* (2013.01); *H04W 4/20* (2013.01); *H04L 65/608* (2013.01)

(58) Field of Classification Search
CPC ....................................... G06F 3/048
USPC ................... 715/808, 718, 761, 771
See application file for complete search history.

(56) References Cited

U.S. PATENT DOCUMENTS

| | | | |
|---|---|---|---|
| 7,958,272 B2 | 6/2011 | Ko et al. | |
| 2005/0203956 A1 | 9/2005 | Dweck et al. | |
| 2008/0209034 A1 | 8/2008 | Shin et al. | |
| 2011/0219105 A1* | 9/2011 | Kryze et al. | 709/223 |
| 2013/0030645 A1* | 1/2013 | Divine et al. | 701/36 |

FOREIGN PATENT DOCUMENTS

| | | |
|---|---|---|
| CN | 101789186 | 7/2010 |
| EP | 1 770 934 | 4/2007 |
| WO | WO 2010/019000 | 2/2010 |

OTHER PUBLICATIONS

Raja Bose et al., "Morphing Smart-phones into Automotive Application Platforms", IEEE Computer Society, May 1, 2011, 9 pages.
European Search Report dated Jun. 1, 2015 issued in counterpart application No. 12835988.2-1870, 5 pages.
Chinese Office Action dated Dec. 3, 2015 issued in counterpart application No. 201280048024.3, 19 pages.

* cited by examiner

*Primary Examiner* — Andrea Leggett
(74) *Attorney, Agent, or Firm* — The Farrell Law Firm, P.C.

(57) ABSTRACT

A method for providing an in-vehicle notification service on a head unit device is provided. The method includes receiving a notification message including event information regarding an event from a mobile device, upon an occurrence of the event; generating an action request message requesting execution of an application related to the event based on the event information and transmitting the action request message to the mobile device; and displaying a Graphical User Interface (GUI) to a user according to the execution of the application.

20 Claims, 8 Drawing Sheets

METHOD FOR PROVIDING IN-VEHICLE NOTIFICATION SERVICE, MACHINE-READABLE STORAGE MEDIUM, HEAD UNIT DEVICE, AND MOBILE DEVICE

PRIORITY

This application claims priority under 35 U.S.C. §119(a) to a Korean Patent Application filed in the Korean Intellectual Property Office on Sep. 29, 2011 and assigned Serial No. 10-2011-0099100, a Korean Patent Application filed in the Korean Intellectual Property Office on Oct. 5, 2011 and assigned Serial No. 10-2011-0101487, and a Korean Patent Application filed in the Korean Intellectual Property Office on Oct. 11, 2011 and assigned Serial No. 10-2011-0103833, the entire disclosure of each of which is incorporated herein by reference.

BACKGROUND OF THE INVENTION

1. Field of the Invention

The present invention relates generally to a method for using an in-vehicle notification service, and more particularly, to a method for providing a notification of a predetermined type between an in-vehicle head unit device and a mobile device.

2. Description of the Related Art

A car has become a place in which a user can enjoy various types of entertainment, not simply to be used for transportation. Thus, so-called infotainment has been developed to allow a user to receive and enjoy media such as music or a video through a mobile device in a vehicle.

An infotainment system provides information to users. The information is typically an audio, a video, or a combination of both. Interaction between a mobile device in a vehicle and an in-vehicle head unit device increases user convenience.

Specifically, interaction between the mobile device and the in-vehicle head unit device will increase user convenience by providing various types of information to satisfy the specific demands of users.

However, no notification mechanism has been specified for services requiring notification, like transmission of call information, message information, or device state information.

SUMMARY OF THE INVENTION

Accordingly, the present invention has been made to solve the above-stated problems occurring in the prior art, and an aspect of the present invention provides a notification mechanism for interaction between a mobile device and an in-vehicle head unit device to provide various types of information such as call information, message information, device state information, etc. according to specific user demands.

In accordance with one embodiment of the present invention, a method for providing an in-vehicle notification service on a head unit device is provided. The method includes receiving a notification message including event information regarding an event from a mobile device, upon an occurrence of the event; generating an action request message requesting execution of an application related to the event based on the event information and transmitting the action request message to the mobile device; and displaying a Graphical User Interface (GUI) to a user according to the execution of the application.

In accordance with another embodiment of the present invention, a mobile device for providing an in-vehicle notification service is provided. The device includes a display for displaying a Graphical User Interface (GUI) related to an event; a communication module for communicating with a head unit device; and a controller for, upon the event occurring, generating a notification message including event information about the event, transmitting the notification message to the head unit device through the communication module, receiving an action request message requesting execution of an application related to the event from the head unit device through the communication module, and transmitting the GUI to the head unit device through the communication module according to the execution of the application.

In accordance with another embodiment of the present invention, there is provided a machine-readable storage medium recording a program for performing the in-vehicle communication service method.

BRIEF DESCRIPTION OF THE DRAWINGS

The above and other aspects, objects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
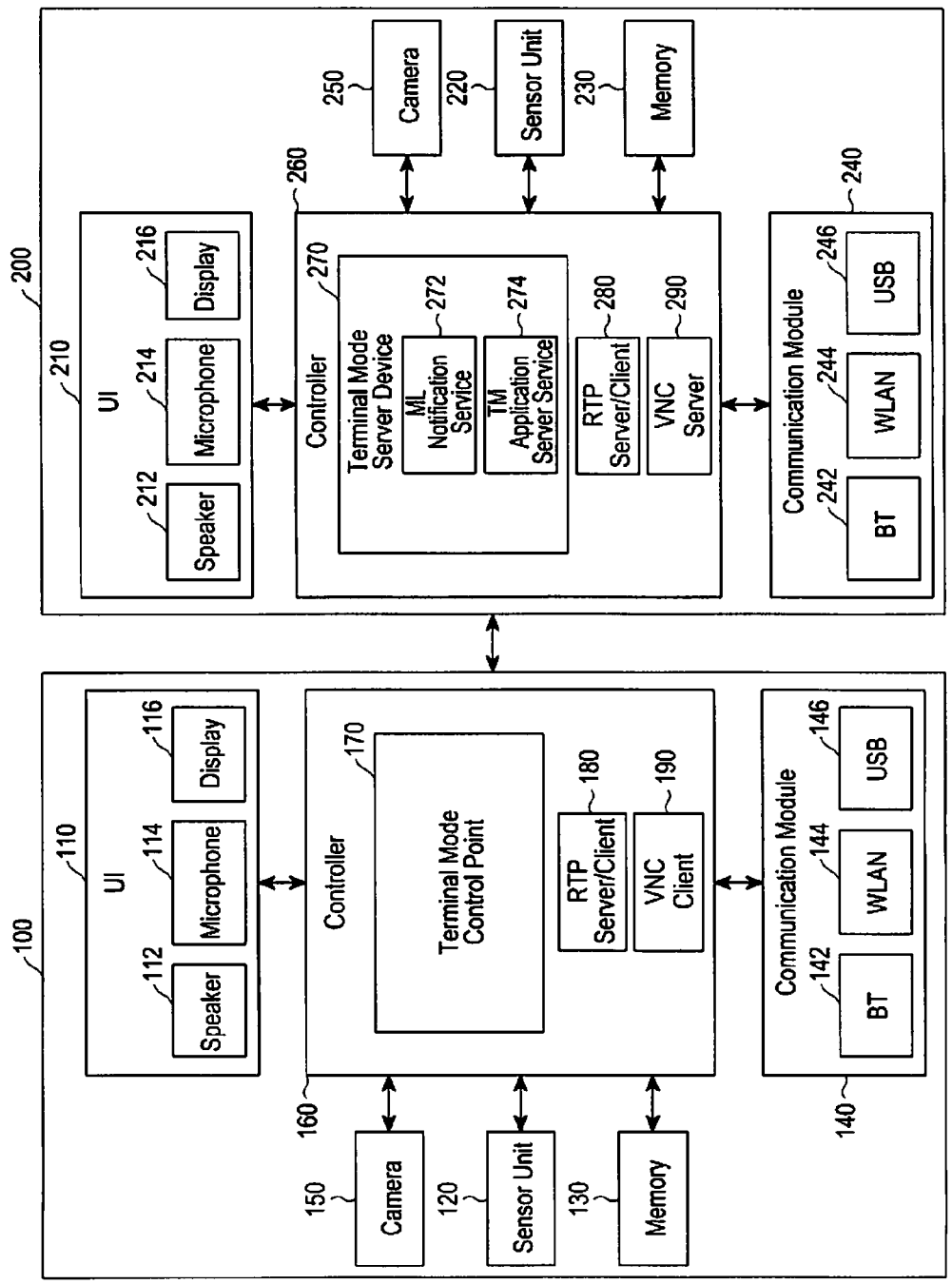
FIG. 1 is a block diagram of an in-vehicle notification service system according to an embodiment of the present invention.

Hereinafter, embodiments of the present invention will be described with reference to the accompanying drawings.

Throughout the drawings, the same elements will be designated by the same reference numerals.

FIG. 1 is a block diagram illustrating an in-vehicle notification service system according to an embodiment of the present invention. The in-vehicle notification service system includes a head unit device 100 and a mobile device 200 that are placed in a vehicle. The in-vehicle notification service system is conforms to the Car Connectivity Consortium (CCC) standard.

The head unit device 100 includes a first User Interface (UI) 110, a first sensor unit 120, a first memory 130, a first communication module 140, a first camera 150, and a first controller 160. The first UI 110 includes a first speaker 112, a first microphone 114, and a first display 116. The head unit device 100 is configured into a communication terminal.

The mobile device 200 is any of a smartphone, a portable phone, a game console, a laptop computer, a tablet PC, a Personal Media Player (PMP), a Personal Digital Assistant (PDA), and the like. The mobile device 200 is a portable device. The mobile device 200 is configured into a portable mobile device achieved by implementing a wireless communication function in a portable device.

The mobile device 200 includes a second UI 210, a second sensor unit 220, a second memory 230, a second communication module 240, a second camera 250, and a second controller 260. The second UI 210 includes a second speaker 212, a second microphone 214, and a second display 216.

The head unit device 100 and the mobile device 200 communicate with one another or are connected to one another through the first and second communication modules 140 and 240 by Transmission Control Protocol/Internet Protocol (TCP/IP). Moreover, the mobile device 200 and the head unit device 100 operate using a service protocol such as Universal Plug and Play (UPnP) to provide an in-vehicle service.

According to a UPnP-based communication scheme, the mobile device 200 acts as a terminal mode server or a Mirror Link (ML) server and the head unit device 100 acts as a terminal mode client or an ML client.

Basic functions common to the mobile device 200 and the head unit device 100 will now be described. For example, "the UI 110 or 210" means the first UI 110 in the head unit device 100 and the second UI 210 in the mobile device 200. That is, the following description is a description of the functions of components in the mobile device 200 or the relationship between them, or the functions of components in the head unit device 100 or the relationship between them.

The UI 110 or 210 is a means for receiving a user input or providing information to a user. The UI 110 or 210 includes a plurality of buttons, a vibration motor, a connector, a keypad, and the like. Examples of the UI 110 or 210 include a mouse, a track ball, a joystick, or cursor directional keys, and the like. Cursor control through the mouse, track ball, joystick, or cursor directional keys is provided for information communication with the controller 160 or 260 and for control of a cursor movement on the display 116 or 216.

The speaker 112 or 212 outputs sound corresponding to various signals (e.g. a radio signal, a broadcast signal, a digital audio file, a digital video file, and a photo shot) to the outside of the device 100 or 200 under the control of the controller 160 or 260. The speaker 112 or 212 outputs sound corresponding to functions performed by the device 100 or 200. One or more speakers 112 or 212 are installed at an appropriate position or positions of the device 100 or 200.

The microphone 114 or 214 receives voice or sound and converts the received voice or sound to an electrical signal under the control of the controller 160 or 260.

Buttons are positioned on the front surface, a side surface, or the rear surface of the device 100 or 200, including a power/lock button (not shown), a volume button (not shown), a menu button, a home button, a back button, and a search button.

The vibration motor converts an electrical signal to mechanical vibrations under the control of the controller 160 or 260. For instance, upon incoming of a voice call or a video call in vibration mode, the device 100 or 200 operates the vibration motor through the communication module 140 or 240. One or more vibration motors are mounted inside the device 100 or 200. The vibration motor operates in response to a user's touch or touch and drag on the display 116 or 216.

The connector is used as an interface for connecting the device 100 or 200 to an external device or power source (not shown). Data stored in the memory 130 or 230 is transmitted to an external device or data is received from the external device, by a cable connected to the connector under the control of the controller 160 or 260. Power is received or a battery is by a cable connected to the connector.

The keypad receives a key input from the user, for control of the device 100 or 200. The keypad is a physical keypad on the device 100 or 200 or a virtual keypad displayed on the display 116 or 216.

The display 116 or 216 displays an image received from the controller 160 or 260 on a screen. The display 116 or 216 is configured with a Liquid Crystal Display (LCD), a touch screen, etc. The display 116 or 216 displays an image, generates a key contact interrupt when a user input tool such as a finger or a stylus pen touches the surface of the display 116 or 216, and outputs user input information specifying input coordinates and an input state to the controller 160 or 260 under the controller 160 or 260.

The display 116 or 216 provides Graphical User Interfaces (GUIs) corresponding to various services or functions (e.g. an in-vehicle notification service, a call, data transmission, broadcasting, and photo/video capturing) to the user. The display 116 or 216 outputs information about a touch input to a GUI (i.e. user input information) to the controller 160 or 260. The display 116 or 216 receives at least one piece of touch information through a user's body part (e.g., a finger) or a touch input tool (e.g., a stylus pen).

In the present invention, a touch is not limited to contact between the display 116 or 216 and a user's body part or a touch input tool, but includes a non-contact (e.g. a case in which the display 116 or 216 is apart from the user's body part or the touch input tool by about 1 millimeter (mm) or less). The display 116 or 216 includes a resistive, capacitive, infrared, or acoustic wave touch screen.

The sensor unit 120 or 220 includes at least one sensor for detecting a state of the device 100 or 200 (e.g. the position, bearing, movement, etc. of the device 100 or 200). For example, the sensor unit 120 or 220 includes a proximity sensor for detecting whether a user is in the vicinity of the device 100 or 200 and how close the user is located to the device 100 or 200, or a motion/bearing sensor for detecting movement of the device 100 or 200 (e.g. rotation, acceleration, deceleration, vibration, etc. of the device 100 or 200). The motion/bearing sensor includes an acceleration sensor, a gravity sensor, a geomagnetic sensor, a gyro sensor, a shock sensor, a Global Positioning System (GPS) sensor, a compass sensor, an acceleration sensor, and the like. The sensor unit 120 or 220 detects the state of the device 100 or 200, generates a signal corresponding to the detected state, and transmits the signal to the controller 160 or 260. For example, the GPS sensor receives signals from a plurality of GPS satellites (not shown) in earth orbit and calculate the GPS position of the device 100 or 200 based on the Time of Arrival (ToA) of the received signals from the GPS satellites to the device 100 or 200. The compass sensor calculates the bearing of the device 100 or 200.

The communication module 140 or 240 connects the device 100 or 200 to a server or an external device directly or via a network. The communication module 140 or 240 is a wired or wireless communication module. The communication module 140 or 240 transmits data received from the controller 160 or 260, the memory 130 or 230, or the camera 150 or 250 by cable or wirelessly. Moreover, the communication module 140 or 240 receives data through an external communication line or the air interface by cable or wirelessly and provides the received data to the controller 160 or 260 or stores the received data in the memory 130 or 230.

The communication module 140 or 240 includes a mobile communication module and at least one of short-range communication modules such as a Wireless Local Access Network (WLAN) module 144 or 244, a Bluetooth (BT) module 142 or 242, a Universal Serial Bus (USB) module 146 or 246. Other examples of the communication module 140 or 240 include an Integrated Services Digital Network (ISDN) module, a modem, an infrared module, a Zigbee module, and the like.

The mobile communication module connects the device 100 or 200 to an external device via a Wide Area Network (WAN) such as a mobile communication network using at least one antenna (not shown) under the control of the controller 160 or 260. The mobile communication module transmits and receives a wireless signal to and from an external device having a phone number or a network address, such as a portable phone, a smart phone, or a tablet PC, to conduct a voice call or a video call and exchange data including a Short Message Service (SMS) message and a MultiMedia Service (MMS) message.

The WLAN module 144 or 244 is connected to the Internet in a place where a wireless Access Point (AP) (not shown) is installed or controls wireless communication between the device 100 or 200 and an external device, under the control of the controller 160 or 260. The WLAN module 144 or 244 supports the WLAN standard of the Institute of Electrical and Electronics Engineers (IEEE), that is, IEEE 802.11x, Wireless Fidelity (WiFi), and WiFi Direct.

The short-range communication modules conduct short-range communication between the device 100 or 200 and an external device under the control of the controller 160 or 260. Short-range communication schemes include Bluetooth, Infrared Data Association (IrDA), and USB communication.

The camera 150 or 250 includes a lens system, an image sensor, and a flash. The camera converts an optical signal incident to the lens system to an electrical image signal and outputs the electrical image signal to the controller 160 or 260. A user captures a video or a still image using the camera 150 or 250.

The lens system forms an image of an object by converging external incident light. The lens system includes at least one lens that is a convex lens or a non-spherical lens. The lens system is symmetrical with respect to an optical axis along the center of the lens system. The optical axis is defined as a central axis. The image sensor detects an optical image formed by external incident light as an electrical image signal. The image sensor is provided with a plurality of pixel units arranged in an M×N matrix and the pixel units include a photodiode and a plurality of transistors. The pixel units accumulate potential generated by the incident light and the voltage of the accumulated potential represents the luminance of the incident light. In processing a still image or an image of a video, an image signal output from the image sensor is a set of voltages (i.e. pixel values) output from the pixel units. An image signal is from one frame (i.e. a still image). A frame includes M×N pixels. The image sensor is a Charge-Coupled Device (CCD) or Complementary Metal-Oxide Semiconductor (CMOS) image sensor.

A driver drives the image sensor under the control of the controller 160 or 260. The driver exposes all of the pixels of the image sensor or only the pixels of an intended area among the whole pixels and outputs image data received from the pixels to the controller 160 or 260.

The controller 160 or 260 processes an image received from the camera 150 or 250 or an image stored in the memory 130 or 230 on a frame basis and outputs an image frame matching to the display characteristics of the display 116 or 216 (e.g. size, video quality, resolution, etc.).

The memory 130 or 230 stores applications for implementing various functions or services like an in-vehicle notification service, navigation, a video call, and games, images for providing GUIs related to the applications, user information, text, data related to the in-vehicle notification service (e.g. messages, setting values, etc.), background images (a menu screen, a standby screen, etc.) or operation programs needed to operate the device 100 or 200, and images captured by the camera 150 or 250. The memory 130 or 230 is a machine-readable medium (e.g. a computer-readable medium). The term "machine-readable medium" means a medium that provides data to a machine so that the machine can perform a specific function. The machine-readable medium is a storage medium. The memory 130 or 230 includes a non-volatile medium and a volatile medium. All these media are of types that allow a physical device to read commands from these media to a machine.

The machine-readable media include, but not limited to, at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash-EPROM.

The controller 160 or 260 executes an application upon the request of an external device, in response to user input information, or according to an automatic execution setting. The application executes a program upon the request of the external device, in response to the user input information, or according to the automatic execution setting. The user input includes an input from the keypad or the display 116 or 216 or a camera-based input. The controller 160 or 260 includes a bus for information communication and a processor connected to the bus, for information processing. The controller 160 or 260 includes a RAM connected to a bus, to store information requested by the processor. The RAM stores temporary information requested by the processor. The device 100 or 200 further includes a ROM connected to a bus, to store static information requested by the processor. The controller 160 or 260 is a Central Processing Unit (CPU) that provides overall control to the device 100 or 200 and performs the in-vehicle notification service method of the present invention.

A description will now be given of the interaction between the mobile device 200 and the head unit device 100.

The head unit device 100 and the mobile device 200 communicate with one another or are connected to each other through the first and second communication modules 140 and 240 by TCP/IP. The head unit device 100 and the mobile device 200 use a service protocol such as UPnP in order to provide the in-vehicle notification service.

The second controller 260 of the mobile device 200 includes a terminal mode server device module 270 for UPnP communication. The terminal mode server device module 270 includes an ML notification service module 272 and a Terminal Mode (TM) application server service module 274.

The ML notification service module 272 is responsible for a notification service between the head unit device 100 and the mobile device 200. The notification service has a service type such as urn:schemas-upnp-org:service:MLNotification: 1. The ML notification service module 272 are also called a TM notification service module. In this case, the service type is urn:schemas-upnp-org:service:TmNotificationServer:1.

The TM application server service module 274 executes or terminates applications in the mobile device 200 or manages applications, for example, retrieves an application list.

The second controller 260 further includes a second Real-Time Transport Protocol (RTP) server/client module 280 for RTP-based media session connection and a Virtual Network Computing (VNC) server module 290 for VNC-based media session connection. VNC is used to display the same screen as displayed on the display 216 of the mobile device 200 on the display 116 of the head unit device 100.

The first controller 160 of the head unit device 100 includes a terminal mode control point 170 for UPnP communication. The terminal mode control point 170 manages media session connectivity and VNC connectivity. The controller 160 further includes a first RTP server/client module 180 for RTP-based media session connection and a VNC client module 190 for VNC-based media session connection.

The terminal mode control point 170 operates the second RTP server/client module 280 of the mobile device 200 and the first RTP server/client module 180 of the head unit device 100, for media streaming connection, that is, RTP connection to conduct a call between the mobile device 200 and the head unit device 100 by transmitting an action request message (or an action invocation message) including a command to the TM application server service module 274. Moreover, the terminal mode control point 170 operates the VNC server module 290 of the mobile device 200 by transmitting a LaunchApplication action request message including a LaunchApplication action command to the TM application server service module 274. The mobile device 200 transmits, to the head unit device 100, a response message including a Uniform Resource Locator (URL) where the VNC client module 190 can access the VNC server module 290 as a return value of the LaunchApplication action command.

For a VNC connection, the VNC server module 290 of the mobile device 200 and the VNC client module 190 of the head unit device 100 are operated.

The terminal mode control point 170 uses the following UPnP action commands as listed in Table 1 below between the terminal mode control point 170 and the ML notification service module 272.

TABLE 1

| Name | Device R/O | Control Point R/O |
| --- | --- | --- |
| GetSupportedNotiTypes( ) | R | R |
| SetNotiConfiguration( ) | R | R |
| InvokeNotiAction( ) | R | R |

In Table 1, R is stands for REQUIRED and O stands for OPTIONAL. Device R/O indicates whether the ML notification service module 272 (or the mobile device 200) is required and Control Point R/O indicates whether the terminal mode control point 170 is required.

Figure 2:
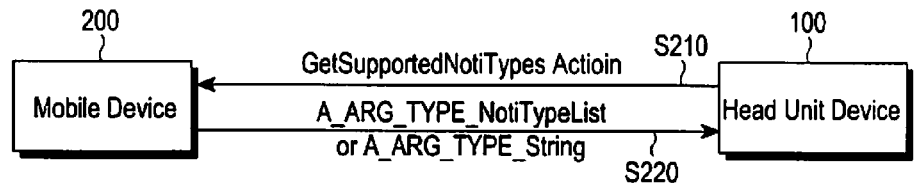
FIG. 2 is a diagram illustrating a signal flow of an action request and a response to the action request.

FIG. 2 is a diagram illustrating a signal flow for describing an action request and a response to the action request.

To request a list of notification types supported by the mobile device 200, the head unit device 100 transmits a GetSupportedNotiTypes action command to the mobile device 200.

Referring to FIG. 2, step S210 is an action request step. Specifically, the terminal mode control point 170 of the head unit device 100 transmits a GetSupportedNotiTypes action request message including a GetSupportedNotiTypes action command requesting a list of notification types supported by the mobile device 200 to the ML notification service module 272 of the mobile device 200 in step S210.

In step S220, the ML notification service module 272 transmits a response message including notification types to the terminal mode control point 170 in response to the action request message.

The response to the GetSupportedNotificationTypes action command includes notification types in the form of A_ARG_TYPE_String separated by commas (,) as illustrated in Table 2. A_ARG_TYPE_is a temporary value.

Each action command has a name and at least one factor or argument. The argument has a Direction and RelatedStateVariable. Direction indicates whether the argument is set as an argument of the action command or output as the result of the action command. RelatedStateVariable is used to determine an argument type.

TABLE 2

| Argument | Direction | RelatedStateVariable |
| --- | --- | --- |
| NotiTypes | OUT | A_ARG_TYPE_String |

Preferably, NotiTypes is configured into a form identifiable to a user. For instance, NotiTypes indicates a call, message, alarm, calendar, etc. Upon receipt of notification types, the terminal mode control point 170 separates commas from the notification types and configures and displays a screen, that is, a notification GUI (or UI) so that the user selects notification types to receive from the mobile device 200 through the head unit device 100.

Figure 3:
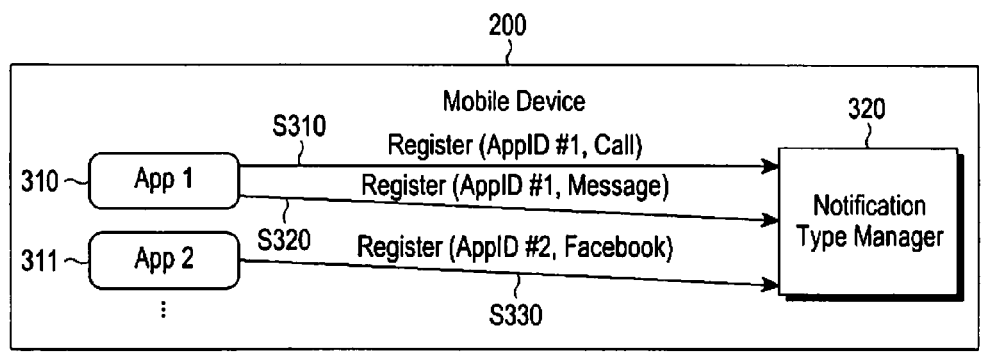
FIG. 3 is a diagram illustrating a signal flow illustrating registering notification types at a mobile device.

FIG. 3 is a diagram illustrating a signal flow of an operation for registering notification types at the mobile device.

Referring to FIG. 3, the mobile device 200 includes a notification type manager 320 for managing a notification type and a plurality of applications 310 and 311 for providing a notification service. Each application that provides a notification service inside the mobile device 200 registers information about the type of a notification that the application provides to the notification type manager 320. Each of the applications 310 and 311 registers its application ID, AppID (or A_ARG_TYPE_AppID) and its notification type to the notification type manager 320. One application supports a plurality of notification services and one notification type is supported by a plurality of applications.

The first application 310 (App1) generates a first register message (or a subscribe message requesting subscription) including its application ID, AppID#1 and a notification type, Call and transmits the first register message to the notification type manager 320 in step S310.

In step S320, App1 generates a second register message including AppID#1 and a notification type, Message and transmits the second register message to the notification type manager 320.

The second application 311 (App2) generates a third register message including its application ID, AppID#2 and a notification type, Facebook and transmits the third register message to the notification type manager 320 in step S330.

A mobile device platform or the notification type manager 320 preserves a basic notification type list and an application uses one of the notification types listed in the notification type list set by the mobile device platform or the notification type manager 320. If the application needs a notification type that is not listed in the notification type list, the application includes the new notification type in a register message. Preferably, the new notification type is readily identifiable to a user.

Figure 4:
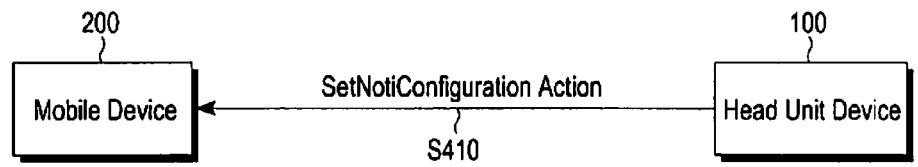
FIG. 4 is a diagram illustrating a signal flow illustrating registering a user-intended notification service to the mobile device.

FIG. 4 is a diagram illustrating a signal flow of an operation for registering user-intended notification messages to the mobile device.

Referring to FIG. 4, the head unit device 100 transmits, to the mobile device 200, a SetNotiConfiguration action request message including user-intended notification service types and a SetNotiConfiguration action command requesting registration of the user-intended notification service type in step S410.

The head unit device 100 sets the user-intended notification types, SelectedNotiTypes as the argument of the SetNotiConfiguration action command, as illustrated in Table 3 below.

TABLE 3

| Argument | Direction | RelatedStateVariable |
|---|---|---|
| SelectedNotiTypes | IN | A_ARG_TYPE_String |

The user-selected notification types are separated by commas (,). If the user wants to receive notification services for all notification types, a "*" value is used. This kind of notification type selection is made according to preset information, that is, default selection information.

Table 4 illustrates the structure of notification event information (or event information), Notification State Variable included in a notification event message (an event notification message or a notification message) that the mobile device 200 transmits to the head unit device 100.

TABLE 4

| Element | Description | Parent | Availability |
|---|---|---|---|
| notification | Notification element contains detail information of an event occurred on a phone and is delivered to a head unit | — | Required |
| notiID | Unique identifier of Notification event. | notification | Required |
| notiType | Notification Type. (A_ARG_TYPE_String) | notification | Required |
| notiTitle | Title of Notification event. In other words, it is a name of an event occurred. For example, new text message or email. (A_ARG_TYPE_String) | notification | Optional |
| notiBody | Body of Notification message. It includes detailed information of an event for a user. For example, text message content for new text message event. Caller ID for an incoming call event. (A_ARG_TYPE_String) | notification | Optional |
| launchApp | It indicates that application ID in the appIDs uses LaunchApplication action or TerminateApplication action. If the value is set to true, then HU invoke LaunchApplication action with one of the application IDs in the app IDs. If false, then HU invoke TerminateApplication instead of LaunchApplication. | notification | Required |
| appIDs | Comma separated list of application IDs. Application ID in the appIDs is unique identifier and MUST be identical with one on A_ARG_TYPE_AppList. (A_ARG_TYPE_String) | notification | Required |
| priority | Level of importance given to Notification message. | notification | Optional |
| actions | A list of action for a notification. The list is provided by an application initiating the notification so a user can directly select a user action for the notification. For example, the user can "Reply" to the new text message or "Ignore" it. The list includes "Reply" and "Ignore" actions as its elements. | notification | Required |
| action | | actions | Required |
| actionID | Unique identifier of action. When a user selects an action for a notification through the notification UI, actionID MUST be sent to the Mobile device. | action | Required |
| actionName | Action name. This name will be shown as a button on the native notification UI. | action | Required |
| appIDs | Comma separated list of application IDs. Application ID in the appIDs is unique identifier and MUST be identical with one on A_ARG_TYPE_AppList. (A_ARG_TYPE_String) | action | Required |

The notification element contains detailed information about an event that has occurred in the mobile device 200 (e.g. a phone) and is delivered to the head unit device 100. The notiID element indicates the unique IDentifier (ID) of the notification event. The notiType element indicates a notification type that is expressed as A_ARG_TYPE_String. The notiTitle element specifies the title of the notification event, that is, the name of the notification event that has occurred. For example, the title of the notification event is a new text message or email, expressed as A_ARG_TYPE_String. The notiBody element is the body of the notification message containing detailed information about the event for a user. For example, the notiBody element does include text message content for a new text message event or a caller ID for an incoming call event, expressed as A_ARG_TYPE_String. The launchApp element indicates that an application ID in the appIDs element indicates a LaunchApplication action or a TerminateApplication action. If the value of the launchApp element is set to true, the head unit device 100 invokes the LaunchApplication action with one of application IDs in the appIDs. On the other hand, if the value is set to false, the head unit device 100 invokes the TerminateApplication action instead of the LaunchApplication action. The appIDs element provides a comma-separated list of application IDs. Each application ID in the appIDs element is a unique ID and must be identical to one on A_ARG_TYPE_AppList, expressed as A_ARG_TYPE_String. The priority element specifies an importance level given to the notification message. The actions element provides a list of actions for a notification. The action list is provided by an application initiating the notification so that a user directly selects a user action for the notification. For example, the user can reply to the new text message or ignore it. The list includes "Replay" and "Ignore" actions as its elements. The actionID element is a unique ID of an action. When a user selects an action for a notification through a notification UI, the actionID element must be transmitted to the mobile device 200. The actionName element indicates an action name. The action name will be shown as a button on a native notification UI. The appIDs element provides a comma-separated list of application IDs. Each application ID in the appleIDs element is a unique ID and is identical to one on A_ARG_TYPE_AppList, expressed as A_ARG_TYPE_String.

Each of the appIDs element including the notification element as its parent and the appIDs element including the action element as its parent takes the form of a comma-separated list of application IDs (i.e. appIDs) expressed as A_ARG_TYPE_AppID. Unless the head unit device 100 provides a native notification GUI, appIDs set in the appIDs element including the notification element as its parent are set as arguments of LaunchApplication action commands or TerminateApplication action commands. The mobile device 200 then invokes the LaunchApplication actions sequentially. One of the LaunchApplication action and the TerminateApplication action is selected based on the truth value of the launchApp element. If the launchApp element is set to true, the mobile device 200 invokes the LaunchApplication action. If the launchApp element is set to false, the mobile device 200 invokes the TerminateApplication action.

However, if the head unit device 100 provides the native notification GUI, the appIDs element having the notification element as its parent is ignored. The appIDs element being a child element of an action element corresponding to a button selected by the user, a button automatically selected by the head unit device 100, or a button selected by the head unit device 100 according to a predetermined rule from among actions represented as buttons of the native notification GUI is executed in the same manner as the appIDs element including the notification element as its parent.

If the head unit device 100 supports the native notification GUI, the actions described in Table 4 are represented as buttons in the native notification GUI. Upon the user selection of one of the buttons, the head unit device 100 transmits to the mobile device 200 an InvokeNotiAction action request message including an InvokeNotiAction action command. The InvokeNotiAction command includes an action ID corresponding to the selected button and the ID of the notification message, ActionID and NotiID. Table 5 below lists arguments of the InvokeNotiAction action.

TABLE 5

| Argument | Direction | RelatedStateVariable |
|---|---|---|
| NotiID | IN | A_ARG_TYPE_NotiID |
| ActionID | IN | A_ARG_TYPE_ActionID |

Table 6 below lists arguments of another InvokeNotiAction action configured to reduce one LaunchApplication action invocation.

TABLE 6

| Argument | Direction | RelatedStateVariable |
|---|---|---|
| NotiID | IN | A_ARG_TYPE_NotiID |
| ActionID | IN | A_ARG_TYPE_ActionID |
| AppID | IN | A_ARG_TYPE_AppID |
| ProfileID | IN | A_ARG_TYPE_ProfileID |
| AppURI | OUT | A_ARG_TYPE_URI |

The AppID argument includes the first application ID, AppID of the appIDs element having the action element as its parent. The mobile device 200 transmits to the head unit device 100 a response message including a Uniform Resource Identifier (URI) with which to access an application having AppID in response to the action request message.

Figure 5:
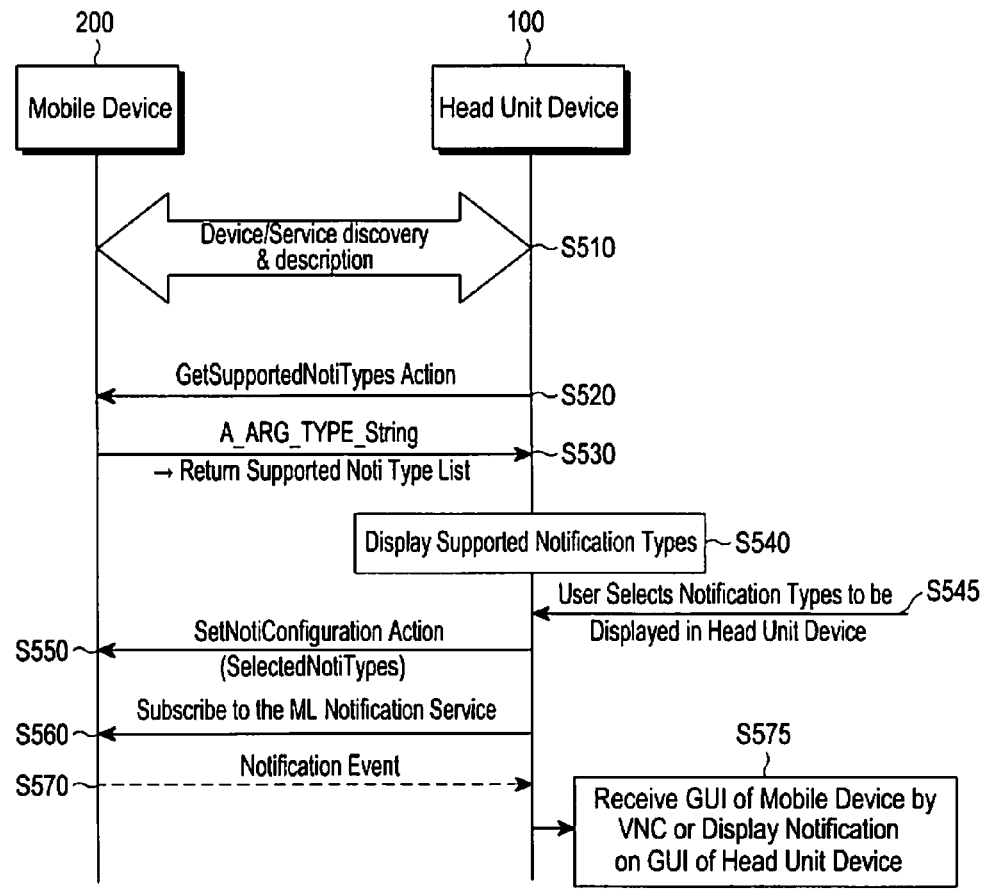
FIG. 5 is a diagram illustrating a signal flow of an initialization operation for receiving a notification message from the mobile device at a head unit device.

FIG. 5 is a diagram illustrating a signal flow of an initialization operation for receiving a notification message from the mobile device at the head unit device.

Step S510 is a device/service discovery & description step in which each of the mobile device 200 and the head unit device 100 discovers the other party by UPnP.

In step S520, when a user wants to receive only intended notification types from the mobile device 200 through the head unit device 100, the head unit device 100 transmits a GetSupportedNotiTypes action request message including a GetSupportedNotiTypes action command to the mobile device 200.

The mobile device 200 transmits a response message including its supported notification types to the head unit device 100 in response to the action request message in step S530. The notification types are expressed in the form of A_ARG_TYPE_String, that is, strings. The response message includes a list of supported notification types.

In step S540, the head unit device 100 displays the received notification types on the first display 116.

The user selects intended notification types from among the displayed notification types in step S545.

The head unit device 100 transmits to the mobile device 200 a SetNotiConfiguration action request message that includes the user-selected notification service types and a SetNotiConfiguration action request requesting registration of these notification types in step S550.

In step S560, the head unit device 100 transmits a subscribe message requesting subscription to an ML notification service to the mobile device 200.

Only when an event to be notified regarding the user-selected notification types has occurred, the mobile device 200 transmits to the head unit device 100 a notification event message including notification event information in step S570.

In step S575, upon the receipt of the notification event message, the head unit device 100 displays the notification event information on the first display 116, that is, on a GUI, or receives a screen, that is, a GUI displayed on the second display of the mobile device 200 by the VNC and displays the received screen to the user.

Figure 6:
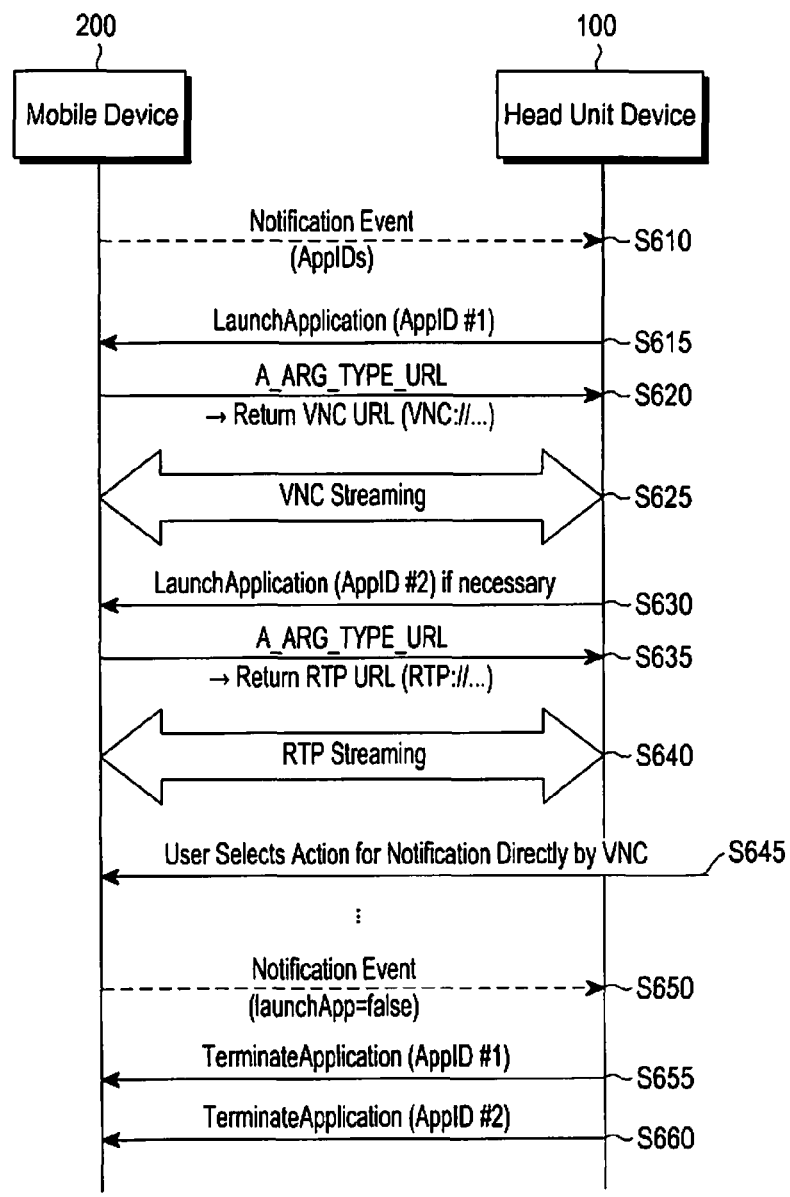
FIG. 6 is a diagram illustrating a signal flow of displaying notification event information by Vehicular Networking Conference (VNC) at the head unit device, after the head unit device receives a notification event message from the mobile device according to an embodiment of the present invention.

FIG. 6 is a diagram illustrating a signal flow for displaying notification event information by the VNC at the head unit device, after the head unit device receives a notification event message from the mobile device according to an embodiment of the present invention.

Referring to FIG. 6, upon the occurrence of an event corresponding to any of user-selected notification types, the mobile device 200 transmits a notification event message including notification event information such as an appIDs element to the head unit device 100 in step S610.

In step S615, the head unit device 100 extracts an appIDs element including a notification element included in the notification event message as a parent, extracts appIDs based on commas from the appIDs element, and transmits a LaunchApplication action request message including a LaunchApplication command having the first (e.g., AppID#1) of the appIDs as an argument to the mobile device 200.

The mobile device 200 transmits to the head unit device 200 a response message including a URL as a return value of the LaunchApplication command, at which the VNC client module 190 can access the VNC server module 290 in step S620. The VNC URL takes the form of "VNC:// . . . . "

In step S625, if the VNC server module 290 is accessible using the VNC URL, the head unit device 100 activates the VNC client module 190 and transmits the VNC URL to the VNC client module 190. The VNC client module 190 can access the VNC server module 290 through the VNC URL. The head unit device 100 then receives a screen, i.e. a GUI displayed on the display 216 of the mobile device 200 by a VNC connection or VNC streaming.

The mobile device 200 then sequentially receives LaunchApplication action commands with other appIDs following the first appID and executes applications mapped to the appIDs. If the applications have already been executed, the applications are notified at the top of the screen.

The head unit device 100 transmits to the mobile device 200 a LaunchApplication action request message including an LaunchApplication action command that has the second (e.g. AppID#2) of the appIDs included in the notification event message as an argument in step S630.

The mobile device 200 transmits to the head unit device 200 a response message including an RTP URL as a return value of the LaunchApplication action command, at which the first RTP server/client module 180 of the head unit device 100 can access the second RTP server/client module 280 of the mobile device 200 in step S635. The RTP URL takes the form of "RTP:// . . . . "

In step S640, if the second RTP server/client module 280 is accessible using the RTP URL, the head unit device 100 activates the first RTP server/client module 180 and transmits the RTP URL to the first RTP server/client module 180. The first RTP server/client module 180 accesses the second RTP server/client module 280 through the RTP URL. The head unit device 100 then receives voice data of an incoming call at the mobile device 200 or transmit the user's voice data of the call to the mobile device 200, by an RTP connection or streaming.

Once a VNC connection is established in the above manner, a user can control a screen, i.e. a GUI displayed on the second display 216 of the mobile device 200 through the head unit device 100.

The user directly selects an action for the notification by VNC in step S645. That is, the user selects an action button displayed on the GUI of the head unit device 100.

In step S650, the mobile device 200 transmits to the head unit device 100 a notification event message having a launchApp element set to false.

The head unit device 100 transmits to the mobile device 200 a TerminateApplication action request message including a TerminateApplication action command having an argument with an appID set to AppID#1 in step S655. The mobile device 200 then terminates the application corresponding to AppID#1.

In step S660, the head unit device 100 transmits to the mobile device 200 a TerminateApplication action request message including a TerminateApplication action command having an argument with an appID set to AppID#2 and the mobile device 200 terminates the application corresponding to AppID#2.

Figure 7:
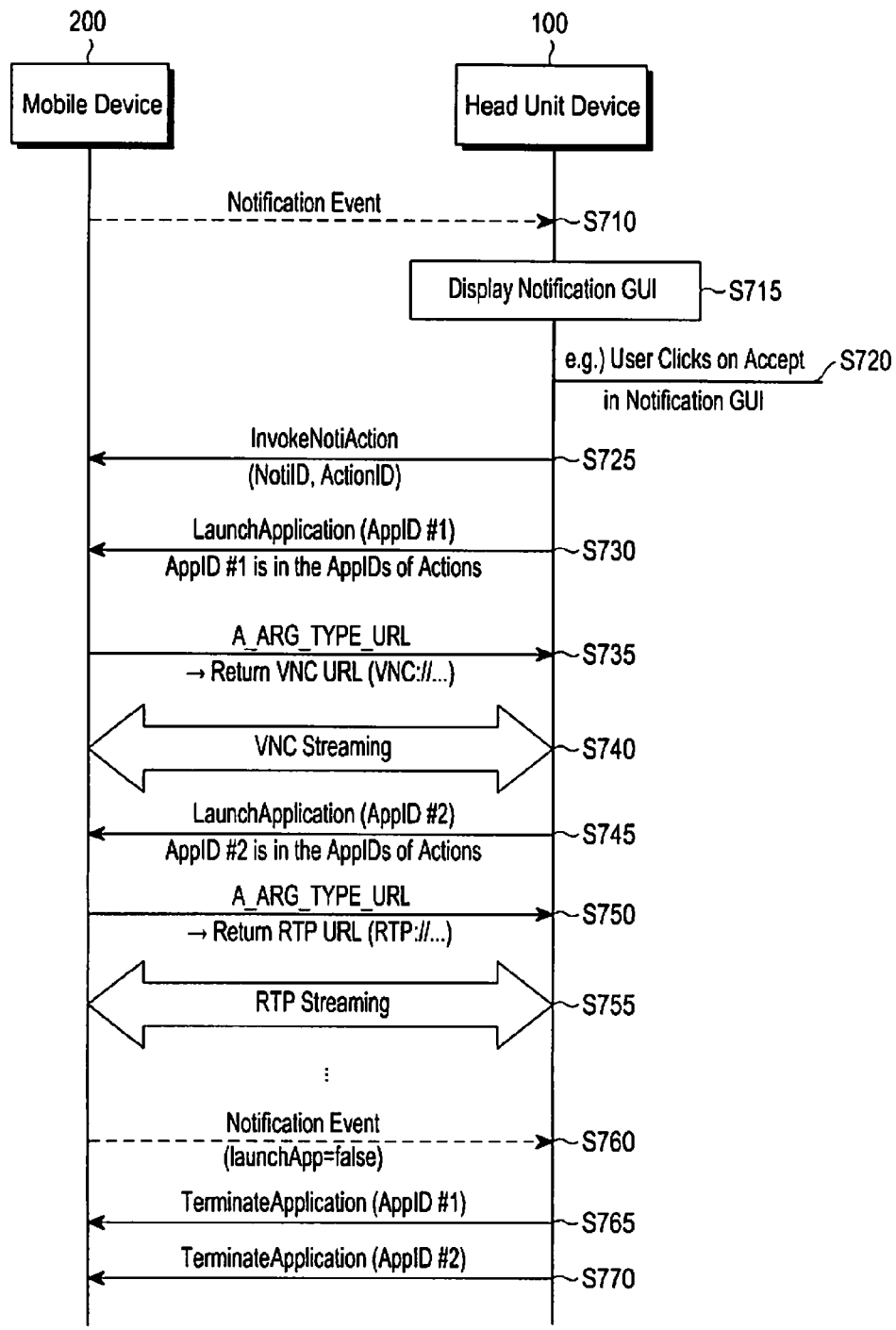
FIG. 7 is a diagram illustrating a signal flow illustrating displaying notification event information on a native notification Graphical User Interface (GUI) at the head unit device, after the head unit device receives a notification event message from the mobile device according to an embodiment of the present invention.

FIG. 7 is a diagram illustrating a signal flow illustrating an operation for displaying notification event information on a native notification GUI at the head unit device, after the head unit device receives a notification event message from the mobile device according to an embodiment of the present invention.

Referring to FIG. 7, upon the occurrence of an event corresponding to any of user-selected notification types, the mobile device 200 transmits a notification event message including notification event information to the head unit device 100 in step S710.

In step S715, the head unit device 100 configures a notification GUI based on the contents of the notification event message.

A user selects an Accept button on the notification GUI in step S720. That is, the user determines whether to receive a notification service.

Upon the user selection of a button on the notification GUI, the head unit device 100 transmits to the mobile device 200 an InvokeNotiAction action request message including an InvokeNotiAction action command that has an action ID corresponding to the button, ActionID and an ID of the notification event message, NotiID as arguments in step S725.

Applications corresponding to appIDs set in an appIDs element being a child element of the user-selected action are executed sequentially by LaunchApplication actions. For example, in the presence of a single appID in the appIDs element, the LaunchApplication action is performed once. In the presence of two appIDs in the appIDs element, the LaunchApplication action is performed twice. If an InvokeNotiAction action command as illustrated in Table 6 is used, one InvokeNotiAction action achieves the same effect as performing the LaunchApplication action once. Therefore, for example, it is not necessary to additionally transmit a LaunchApplication action request message for executing the application with AppID#1 as its appID.

In step S730, the head unit device 100 extracts an appIDs element including a notification element set in the notification event message as its parent, extracts appIDs from the appID element based on commas, and transmits to the mobile device 200 a LaunchApplication action request message including a LaunchApplication action command that has the first appID (e.g. AppID#1) of the appIDs element as an argument.

The mobile device 200 transmits to the head unit device 100 a response message having a URL at which the VNC client module 190 can access the VNC server module 290, as a return value of the LaunchApplication action command in step S735. The VNC URL takes the form of "VNC:// . . . ."

In step S740, if the VNC server module 290 is accessible using the VNC URL, the head unit device 100 activates the VNC client module 190 and transmits the VNC URL to the VNC client module 190. The VNC client module 190 access the VNC server module 290 through the VNC URL. Then, the head unit device 100 receives a screen, i.e. a GUI displayed on the display 216 of the mobile device 200 by a VNC connection or streaming.

In step S745, the head unit device 100 then transmits, to the mobile device 200, a LaunchApplication action request message including a LaunchApplication command having the second (e.g. AppID#2) of the appIDs included in the notification event message as an argument.

The mobile device 200 transmits to the head unit device 100 a response message including an RTP URL as a return value of the LaunchApplication action command, at which the first RTP server/client module 180 can access the second RTP server/client module 280 in step S750. The RTP URL takes the form of "RTP:// . . . ."

In step S755, if the second RTP server/client module 280 is accessible using the RTP URL, the head unit device 100 activates the first RTP server/client module 180 and transmits the RTP URL to the first RTP server/client module 180. The first RTP server/client module 180 can access the second RTP server/client module 280 through the RTP URL. The head unit device 100 receives voice data of a call incoming at the mobile device 200 or transmit user's voice data of the call to the mobile device 200, by an RTP connection or streaming.

Once a VNC connection is established in the above manner, a user can control a screen, i.e. a GUI displayed on the second display 216 of the mobile device 200 through the head unit device 100.

In step S760, the mobile device 200 transmits to the head unit device 100 an event notification message having a launchApp element set to false.

The head unit device 100 transmits to the mobile device 200 a TerminateApplication action request message that includes a TerminateApplication action command having an argument with an appID set to AppID#1 and the mobile device 200 terminates the application corresponding to AppID#1 in step S765.

In step S770, the head unit device 100 transmits, to the mobile device 200, a TerminateApplication action request message that includes a TerminateApplication action command having an argument with an appID set to AppID#2 and the mobile device 200 terminates the application corresponding to AppID#2.

Figure 8:
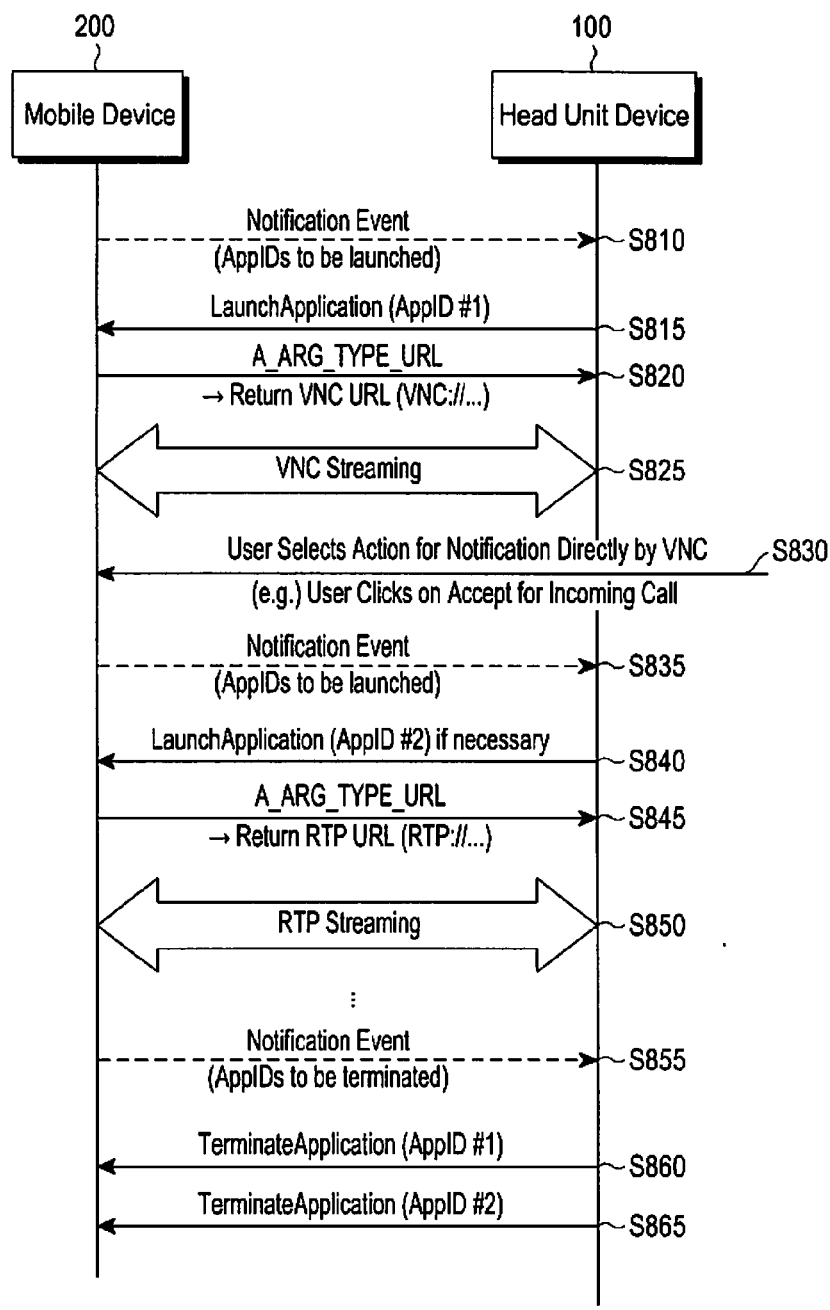
FIG. 8 is a diagram illustrating a signal flow illustrating displaying notification event information by VNC at the head unit device, after the head unit device receives a simple notification event message from the mobile device according to another embodiment of the present invention.

FIG. 8 is a diagram illustrating a signal flow of an operation for displaying notification event information by the VNC at the head unit device, after the head unit device receives a simple notification event message from the mobile device according to another embodiment of the present invention.

Table 7 below illustrates the data structure of a notification event message.

TABLE 7

| Element | Description | Parent | Availability |
| --- | --- | --- | --- |
| notiEvent | Simple notification event message. This element contains simple information to let the head unit device know that the notification event has occurred to a phone. | — | Required |
| notiID | Unique identifier of Notification event. | notiEvent | Required |
| appIDs | Comma separated list of application IDs. Application ID in the appIDs is unique identifier and MUST be identical with one on A_ARG_TYPE_AppList, and each application ID has a prefix value between 'L' or 'T'. If the Application ID has a prefix value with 'L', the head unit will invoke the LaunchApplication action with the application ID, whereas if it has a prefix value with 'T', the head unit invokes TerminateApplication action with the application ID. (A_ARG_TYPE_String) | notiEvent | Required |

The notiEvent element indicates that the transmitted message is a simple notification event message and lets the head unit device 100 know that a notification event has occurred in the mobile device 200. The notiID element is a unique ID of the notification event. The appIDs element provides a comma-separated list of application IDs. An application ID in the appIDs element is a unique ID and must be identical to one on A_ARG_TYPE_AppList. Each application ID has a prefix value between "L" and "T". If the application ID has the prefix value of "L", the head unit device 100 invokes the LaunchApplication action with the application ID. On the other hand, if the application ID has the prefix value of "T", the head unit device invokes the TerminateApplication action with the application ID. The appIDs element is expressed as A_ARG_TYPE_String.

The notiEvent element (or notiEvent state variable) indicates to the head unit device 100 that a notification event has occurred in the mobile device 200. The notification event message includes the notiID element indicating the unique ID of the event notification, and the appIDs element for directly executing an application such as VNC for the head unit device 100 that does not support a native notification GUI. The appIDs element includes a plurality of application IDs separated by commas. "L" or "T" are added before each application ID. When "L" is present before an application ID, an application corresponding to the application ID is executed by invoking the LaunchApplication action with the application ID. When "T" is present before an application ID, an application corresponding to the application ID is terminated by invoking the TerminateApplication action with the application ID. Table 8 below illustrates an embodiment of the appIDs element. The "L" and "T" values are replaced with other distinguishing values. For instance, "L" can be replaced with "*" and "T" can be replaced with "$".

Or, instead of using "L", no tag is added before an application ID to indicate executing an application and "!" is added before the application ID to indicate termination of the application, as illustrated in Table 9.

TABLE 8

...
<appIDs>L0x01,L0x02,T0x03</appIDs>
...

TABLE 9

```
...
<appIDs>0x01,0x02,!0x03</appIDs>
...
```

Referring to Table 8, upon receipt of a notification event message having an appIDs element, the head unit device 100 which intends to display a notification GUI by VNC executes an application with an application ID of 0x01 by invoking the LaunchApplication and subsequently executes an application with an application ID of 0x02 by invoking the LaunchApplication. On the other hand, the head unit device 100 terminates an application with an application ID of 0x03 by invoking the TerminateApplication action.

If the head unit device 100 provides a native notification GUI, it ignores the appIDs element.

Upon receipt of a notification event message having the above-described data structure, the head unit device 100 sequentially executes or terminates applications by interpreting the appIDs element.

Upon occurrence of an event corresponding to any of user-selected notification types, the mobile device 200 transmits to the head unit device 100 a notification event message including notification event information with application IDs of applications to be executed in step S810.

In step S815, the head unit device 100 extracts an appIDs element including a notification element in the notification event message as a parent, extracts appIDs from the appIDs element based on commas, and transmits to the mobile device 200 a LaunchApplication action request message including a LaunchApplication action command with the first appID (e.g., AppID#1) of the appIDs element as an argument.

The mobile device 200 executes an application with AppID#1 by invoking the LaunchApplication action in step S820. If the application with AppID#1 is being executed, the application is notified at the top of the screen of the mobile device 200. The mobile device 200 transmits to the head unit device 100 a response message including a URL at which the VNC client module 190 can access the VNC server module 290, as a return value of the LaunchApplication action command. The VNC URL takes the form of "VNC:// . . . . "

In step S825, if the VNC server module 290 is accessible using the VNC URL, the head unit device 100 activates the VNC client module 190 and transmits the VNC URL to the VNC client module 190. The VNC client module 190 accesses the VNC server module 290 through the VNC URL. The head unit device 100 then receives a screen, i.e. a GUI displayed on the display 216 of the mobile device 200 by a VNC connection or streaming. When the notification GUI of the mobile device 200 is shown on the head unit device 100 by VNC, the user can control the mobile device 200 by VNC. Each time the mobile device 200 receives a user input by VNC, the mobile device 200 transmits an event notification message illustrated in Table 7 to the head unit device 100, when needed.

In step S830, the user directly selects an action for the notification by VNC. For example, the user selects an Accept button for an incoming call by VNC. That is, the user selects the Accept button displayed on the GUI of the head unit device 100.

In step S835, the mobile device 200 transmits a notification event message to the head unit device 100 in order to implement RTP. The notification event message includes an appIDs element indicating applications to be executed.

The head unit device 100 transmits to the mobile device 100 a LaunchApplication action request message including a LaunchApplication action command with the second appID (e.g., AppID#2) of appIDs included in the notification event message as an argument in step S840.

The mobile device 200 transmits to the head unit device 200 a response message including an RTP URL as a return value of the LaunchApplication action command, at which the first RTP server/client module 180 accesses the second RTP server/client module 280 in step S845. The RTP URL takes the form of "RTP:// . . . . "

In step S850, if the second RTP server/client module 280 is accessible using the RTP URL, the head unit device 100 activates the first RTP server/client module 180 and transmits the RTP URL to the first RTP server/client module 180. The first RTP server/client module 180 accesses the second RTP server/client module 280 through the RTP URL. Then, the head unit device 100 receives voice data of a call incoming at the mobile device 200 or transmit the user's voice data of the call to the mobile device 200, by an RTP connection or streaming. When the user terminates the call on the VNC GUI, the mobile device 200 transmits a notification event message to the head unit device 100 in order to terminate the VNC connection and the RTP connection.

In step S855, the mobile device 200 transmits a notification event message including IDs of applications to be terminated to the head unit device 100.

The head unit device 100 transmits, to the mobile device 200, a TerminateApplication action request message including a TerminateApplication action command that has an argument with an appID set to AppID#1 and the mobile device 200 terminates the application corresponding to AppID#1 in step S860.

In step S865, the head unit device 100 transmits to the mobile device 200 a TerminateApplication action request message including a TerminateApplication action command that has an argument with an appID set to AppID#2 and the mobile device 200 terminates the application corresponding to AppID#2.

Figure 9:
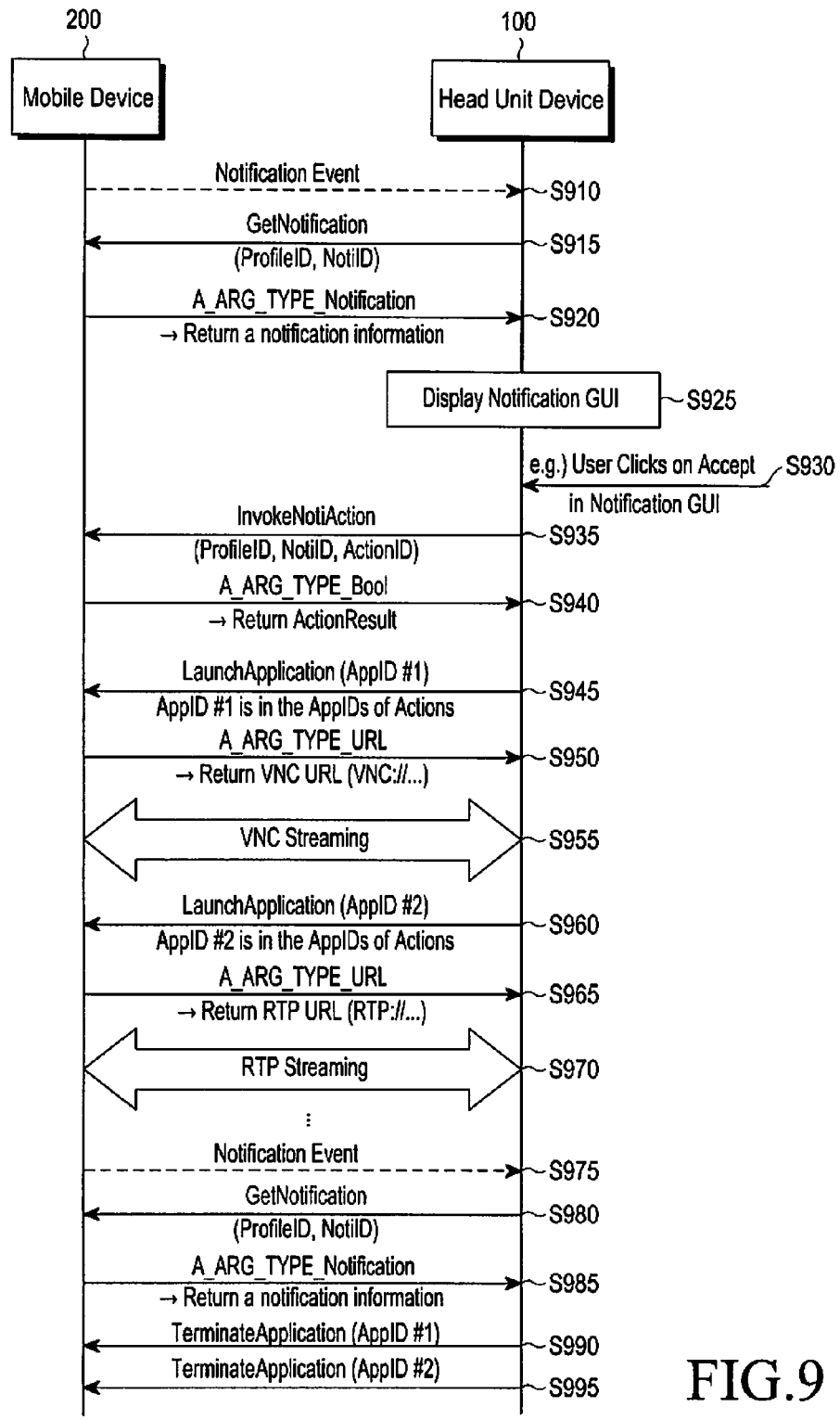
FIG. 9 is a diagram illustrating a signal flow illustrating displaying notification event information on a native notification GUI at the head unit device, after the head unit device receives a simple notification event message from the mobile device according to another embodiment of the present invention.

FIG. 9 is a diagram illustrating a signal flow illustrating displaying notification event information on a native notification GUI at the head unit device, after the head unit device receives a simple notification event message from the mobile device according to another embodiment of the present invention.

Referring to FIG. 9, upon the occurrence of an event corresponding to any of user-selected notification types, the mobile device 200 transmits a notification event message including event notification information to the head unit device 100 in step S910.

When the mobile device 200 transmits a notification event message to the head unit device 100, the head unit device 100 has difficulty in configuring a native notification GUI only with information included in the notification event message. Therefore, the head unit device 100 acquires additional information about the event by invoking a GetNotification action as illustrated in Table 10 below.

TABLE 10

| Argument | Direction | RelatedStateVariable |
| --- | --- | --- |
| ProfileID | IN | A_ARG_TYPE_ProfileID |
| NotiID | IN | A_ARG_TYPE_NotiID |
| Notification | OUT | A_ARG_TYPE_Notification |

In step S915, to acquire more detailed notification event information by the GetNotification action, the head unit device 100 includes an event notification ID, NotiID set in the notification event message and a self-generated profile ID in a GetNotification action request message and transmits the GetNotification action request message to the mobile device 200.

The mobile device 200 transmits to the head unit device 100 a notification information message (an event information message or a second notification message) including detailed information about the notification event corresponding to the NotiID in response to the GetNotification action request message, as illustrated in Table 11 in step S920.

TABLE 11

| Element | Description | Parent | Availability |
|---|---|---|---|
| notification | Notification element contains detail information of an event occurred on a phone and is delivered to a head unit | — | Required |
| notiID | Unique identifier of Notification event. (A_ARG_TYPE_NotiID) | notification | Required |
| notiType | Type of Notification event. The notification type is provided by an application initiating the notification. It indicates what kind of notification it is. For example, "Call", "Message", or "Alarm" etc. (A_ARG_TYPE_String) | notification | Required |
| notiStyle | Display style of a notification. Pop-up style, banner style, full-screen style and hidden style are available. It MUST be one of the values "popup", "banner", "fullscreen" and "hidden". (A_ARG_TYPE_String) | notification | Optional |
| notiTitle | Title of Notification event. In other words, it is a name of an event occurred. For example, new text message or email. (A_ARG_TYPE_String) | notification | Optional |
| notiBody | Body of Notification event. It includes detailed information of an event for a user. For example, text message content for new text message event. Caller ID for an incoming call event. (A_ARG_TYPE_String) | notification | Optional |
| iconList | List of available application icons | notification | Optional |
| icon* | Describes an application icon | iconList | Optional |
| mimetype | Type of icon image | icon | Required |
| width | Width of icon (A_ARG_TYPE_INT) | icon | Required |
| height | Height of icon (A_ARG_TYPE_INT) | icon | Required |
| depth | Color depth of icon (A_ARG_TYPE_INT) | icon | Required |
| url | URL where icon is available | icon | Required |
| appIDs | Comma separated list of application IDs. Application ID in the appIDs is unique identifier and MUST be identical with one on A_ARG_TYPE_AppList, and each application ID has a prefix value between 'L' or 'T'. If the Application ID has a prefix value with 'L', the head unit will invoke the LaunchApplication action with the application ID, whereas if it has a prefix value with 'T', the head unit invokes TerminateApplication action with the application ID. If the notification message contains actions element, the value of this element cannot be empty string. (A_ARG_TYPE_String) | notification | Required |
| priority | The priority of the notification. It MUST be one of the values between "normal" and "emergency". (A_ARG_TYPE_String) | notification | Optional |
| actions | A list of action for a notification. The list is provided by an application initiating the notification so a user can directly select one of those actions for the notification. For example, the user can "Reply" to the new text message or "Ignore" it. The list includes "Reply" and "Ignore" actions as its elements. This element MUST only be used in the notification message when the head unit shows its own notification UI with buttons to get the user input; otherwise the mobile device MUST not include this element in the notification message. | notification | Optional |
| action* |  | actions | Required |
| actionID | Unique identifier of action. When a user selects an action for a notification through the native notification UI served by the head unit, actionID MUST be sent to the mobile device. (A_ARG_TYPE_ActionID) | action | Required |
| actionName | Action name. This name will be shown as a button on the native notification UI. (A_ARG_TYPE_String) | action | Required |

TABLE 11-continued

| Element | Description | Parent | Availability |
|---------|-------------|--------|--------------|
| appIDs | Comma separated list of application IDs. Application ID in the appIDs is unique identifier and MUST be identical with one on A_ARG_TYPE_AppList, and each application ID has a prefix value between 'L' or 'T'. If the Application ID has a prefix value with 'L', the head unit will invoke the LaunchApplication action with the application ID, whereas if it has a prefix value with 'T', the head unit invokes TerminateApplication action with the application ID. (A_ARG_TYPE_String) | action | Required |

The notification element contains detailed information about an event that has occurred in the mobile device 200 (e.g. a phone) and the detailed information about the event is delivered to the head unit device 100. The notiID element is a unique ID of the notification event, expressed as A_ARG_TYPE_notiID. The notiType element indicates the type of the notification event and is provided by an application initiating the notification. The notiType element specifies the type of the notification such as Call, Message, or Alarm etc., expressed as A_ARG_TYPE_String. The notiStyle element indicates the display style of the notification, which should be one of pop-up, banner, full-screen, hidden styles, and the like. A hidden style is when an indicator for the notification is displayed to the user without directly displaying message content to notify the user. The notiTitle element indicates the type of the notification event. In other words, it is the name of the event that has occurred. For example, the name of the event is a new text message or email, expressed as A_ARG_TYPE_String. The notiBody element provides the body of the notification event. It includes detailed information about the event for a user. For example, the notiBody element provides text message content for a new text message event or a call ID for an incoming call event, expressed as A_ARG_TYPE_String. The iconList element provides a list of available application icons. The icon* element describes an application icon and the mimetype element indicates the type of an icon image. The width element specifies the width of the icon, expressed as A_ARG_TYPE_INT. The height element specifies the height of the icon, expressed as A_ARG_TYPE_INT. The depth element specifies the color depth of the icon, expressed as A_ARG_TYPE_INT. The url element indicates a URL where the icon is available. The appIDs element provides a comma-separated list of application IDs. An application ID in the appIDs is a unique ID and must be identical to one on A_ARG_TYPE_AppList. Each application ID has a prefix value between L and T. If the application ID has the prefix value of L, the head unit device 100 invokes the LaunchApplication action with the application ID. However, if the application ID has the prefix value of T, the head unit device 100 invokes the TerminateApplication action with the application ID. If the notification information message includes the actions element, the appIDs element has an empty string value. The appIDs element is expressed as A_ARG_TYPE_String. The priority element indicates the priority of the notification. It has one of values "normal" and "emergency", expressed as A_ARG_TYPE_String. The actions element provides a list of actions for the notification. The list is provided by an application initiating the notification so that a user directly selects one of the actions for the notification. For example, the user can reply to a new text message or ignore it. The list includes "Reply" and "Ignore" actions as its elements. The actions element is only used in the notification information message, when the head unit device 100 shows its own notification UI with buttons to get a user input. Otherwise, the mobile device 200 should not include this element in the notification information message. The actionID element is a unique ID of an action, expressed as A_ARG_TYPE_ActionID. When a user selects an action for the notification through the native notification UI serviced by the head unit device 100, the actionID element should be transmitted to the mobile device 200. The actionName element is the name of an action. The name is shown as a button on the native notification GUI. The appIDs element provides a comma-separated list of application IDs. An application ID in the appIDs element is a unique ID and must be identical to one on A_ARG_TYPE_AppList. Each application ID has a prefix value between "L" and "T". If the application ID has the prefix value of "L", the head unit device 100 invokes the LaunchApplication action with the application ID. However, if the application ID has the prefix value of "T", the head unit device invokes the TerminateApplication action with the application ID. The appIDs element is expressed as A_ARG_TYPE_String.

In step S925, the head unit device 100 configures a notification GUI based on the contents of the notification information message. Among the elements of the notification information message, the actions element is used in configuring a button through which a user input is received, when the head unit device 100 configures its own notification GUI based on the notification information message. In other cases, the actions element is not included in the notification information message. In the presence of the actions element, the appIDs element having a notification element as a parent has an empty string. However, in the absence of the actions element, the appIDs element includes application IDs to be executed or terminated according to a rule, and the head unit device 100 sequentially executes or terminates the application IDs included in the appIDs element.

In step S930, the user selects an Accept button on the notification GUI.

Upon the user selection of a button on the notification GUI, the head unit device 100 transmits to the mobile device 200 an InvokeNotiAction action request message including an InvokeNotiAction action command that has ActionID corresponding to the button and the ID of the notification event message, NotiID as arguments. The InvokeNotiAction action has the following arguments as listed in Table 12 below.

TABLE 12

| Argument | Direction | relatedStateVariable |
|----------|-----------|----------------------|
| ProfileID | IN | A_ARG_TYPE_ProfileID |
| NotiID | IN | A_ARG_TYPE_NotiID |
| ActionID | IN | A_ARG_TYPE_ActionID |
| ActionResult | OUT | A_ARG_TYPE_Bool |

In step S940, the mobile device 200 transmits to the head unit device 100 a response message including a Boolean value indicating true or false for the result of the action, ActionResult.

If ActionResult is true, the head unit device 100 extracts appIDs from the notification information message received by invoking the GetNotification action and sequentially executes applications such as VNC, RTP, and the like.

The head unit device 100 extracts the appIDs element including the notification element included in the notification information message as a parent, extracts appIDs from the appIDs element based on commas, and transmits a LaunchApplication action request message including an LaunchApplication command having the first (e.g., AppID#1) of the appIDs as an argument to the mobile device 200 in step S945.

The mobile device 200 transmits to the head unit device 200 a response message including a URL as a return value of the LaunchApplication command, at which the VNC client module 190 can access the VNC server module 290 in step S950. The VNC URL takes the form of "VNC:// . . . . "

In step S955, if the VNC server module 290 is accessible using the VNC URL, the head unit device 100 activates the VNC client module 190 and transmits the VNC URL to the VNC client module 190. The VNC client module 190 accesses the VNC server module 290 through the VNC URL. Then, the head unit device 100 receives a screen, i.e. a GUI displayed on the display 216 of the mobile device 200 by a VNC connection or streaming.

The head unit device 100 then transmits to the mobile device 200 a LaunchApplication action request message including an LaunchApplication command having the second (e.g. AppID#2) of the appIDs included in the notification event message as an argument in step S960.

The mobile device 200 transmits to the head unit device 200 a response message including an RTP URL as a return value of the LaunchApplication action command, at which the first RTP server/client module 180 can access the second RTP server/client module 280 in step S965. The RTP URL takes the form of "RTP:// . . . . "

In step S970, if the second RTP server/client module 280 is accessible using the RTP URL, the head unit device 100 activates the first RTP server/client module 180 and transmits the RTP URL to the first RTP server/client module 180. The first RTP server/client module 180 accesses the second RTP server/client module 280 through the RTP URL. Then, the head unit device 100 receives voice data of a call incoming at the mobile device 200 or transmit user's voice data of the call to the mobile device 200, by an RTP connection or streaming.

Once a VNC connection is established in the above manner, a user controls a screen, i.e., a GUI displayed on the second display 216 of the mobile device 200 through the head unit device 100.

To terminate specific applications, the mobile device 200 transmits a notification event message to the head unit device 100 in step S975.

To get more detailed event notification information by invoking the GetNotification action, the head unit device 100 includes an event notification ID, NotiID set in the notification event message and a profile ID in a GetNotification action request message and transmits the GetNotification action request message to the mobile device 200 in step S980.

The mobile device 200 transmits to the head unit device 100 a notification information message including detailed information about an event corresponding to the NotiID as illustrated in (Table 11) in response to the GetNotification action request message in step S985.

Because the head unit device 100 does not need to show button information to the user through its own notification GUI, the detailed notification information message does not include an actions element and includes application IDs to be terminated along with a tag value ("L" or "T", herein "T" is added before an application ID) in an appIDs element having a notification element as a parent in a notification information message and transmits the notification information message to the head unit device 100.

The head unit device 100 terminates the related applications by analyzing the appIDs element.

The head unit device 100 transmits to the mobile device 200 a TerminateApplication action request message that includes a TerminateApplication action command having an argument with an appID set to AppID#1 and the mobile device 200 terminates the application corresponding to AppID#1 in step S990.

In step S995, the head unit device 100 transmits to the mobile device 200 a TerminateApplication action request message that includes a TerminateApplication action command having an argument with an appID set to AppID#2 and the mobile device 200 terminates the application corresponding to AppID#2.

If the head unit device 100 is to be configured to operate uniformly, irrespective of whether it provides a notification GUI or not, the mobile device 200 transmits only a notification ID, notiID to the head unit device 100, instead of a notiEvent state variable, and the head unit device 100 always acquires detailed information about an event notification by the GetNotification action. Herein, the argument is the received notification ID.

Figure 10:
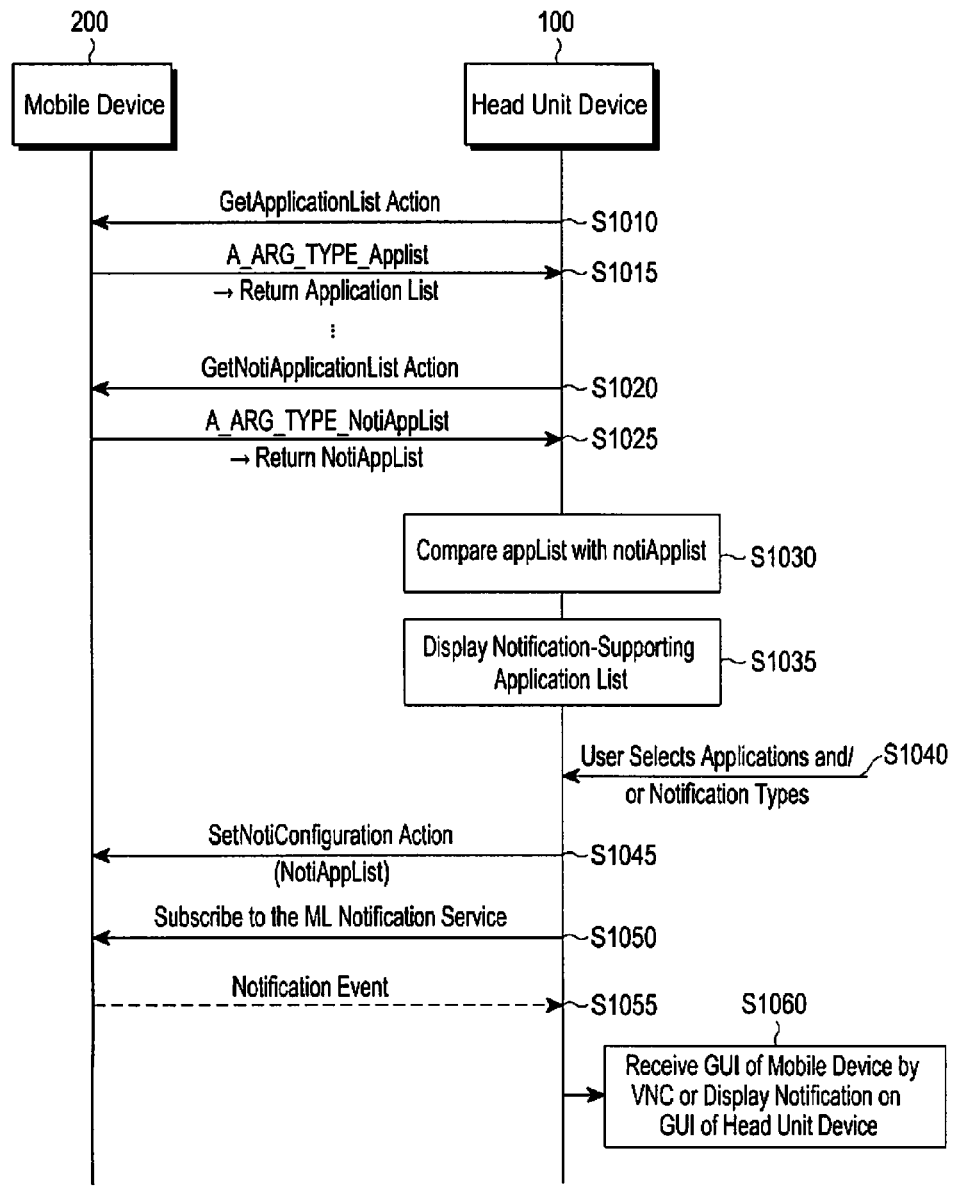
FIG. 10 is a diagram illustrating a signal flow for supporting a plurality of types of notification services with one application.

FIG. 10 is a diagram illustrating a signal flow for supporting a plurality of types of notification services with one application.

When the head unit device 100 is connected to the mobile device 200, it receives an application list from the mobile device 200 and stores the application list.

The head unit device 100 transmits an action request message to the mobile device 200 in step S1010. The action request message includes a GetApplicationList action command requesting an application list.

In step S1015, the mobile device 200 transmits the application list, ApplicationList to the head unit device 100.

If the head unit device 100 wants to receive notifications for user-desired applications and their notification types, the head unit device 100 receives an application list supporting the notification service by an GetNotiApplicationList action with the following arguments listed in Table 13 below.

In step S1020, the head unit device 100 transmits to the mobile device 200 an action request message including a GetNotiApplicationList action command requesting a notification-supporting application list.

TABLE 13

| Argument | Direction | relatedStateVariable |
| --- | --- | --- |
| ProfileID | IN | A_ARG_TYPE_ProfileID |
| NotiAppList | OUT | A_ARG_TYPE_NotiAppList |

The mobile device 200 transmits the notification-supporting application list, NotiAppList to the head unit device 100 in response to the GetNotiApplicationList action command in step S1025. The notification-supporting application list, NotiAppList has a data structure illustrated in Table 14 below.

TABLE 14

| Element | Description | Parent | Availability |
| --- | --- | --- | --- |
| notiAppList | Application List supporting a notification. | — | Required |
| notiApp* | Entry describing one remote application supporting a notification | notiAppList | Required |
| appID | Unique application ID | notiApp | Required |
| NotiTypes | Comma separated list of notification types. One application can support several notification types (e.g., "call, sms, facebook, twitter". It cannot be an empty string. (A_ARG_TYPE_String) | notiApp | Required |

The notiAppList element indicates an application list supporting notification. The notiApp element describes a remote application supporting notification. The appID element provides a unique application ID. The NotiTypes element provides a comma-separated list of notification types. One application can support several notification types, for example, Call, SMS, Facebook, Twitter, etc. and it should not be an empty string. It can be expressed as A_ARG_TYPE_String. Table 14 includes IDs of applications supporting the notification service, and notification types supported by each application. The mobile device 200 configures XML values as illustrated in Table 14 by the procedure illustrated in FIG. 3 and transmits the XML values to the head unit device 100 by the GetNotiApplicationList action.

In step S1030, the head unit device 100 compares the application list ApplicationList resulting from the GetApplicationList action with the notification-supporting application list NotiAppList.

The head unit device 100 displays the application list supporting the notification service to a user on a screen, that is, a notification GUI in step S1035. When necessary, notification types supported by each application are also be displayed.

In step S1040, the user selects an application and/or a notification type on the displayed notification GUI.

The head unit device 100 transmits a SetNotiConfiguration action request message to the mobile device 200 in step S1045. The SetNotiConfiguration action request message includes user-selected notification types and a SetNotiConfiguration action command requesting registration of these notification types.

The user selects desired applications and select desired notification types from among the notification types supported by each application. The selected values are set as arguments of the SetNotiConfiguration action as illustrated in Table 15 below and transmitted to the mobile device 200. The mobile device 200 internally stores the received arguments. The mobile device 200 then transmits only the user-desired notifications based on the arguments to the head unit device 100.

TABLE 15

| Argument | Direction | relatedStateVariable |
| --- | --- | --- |
| NotiAppList | IN | A_ARG_TYPE_NotiAppList |
| MinPriority | IN | A_ARG_TYPE_String |
| ProfileID | IN | A_ARG_TYPE_ProfileID |

If the user does not receive notifications selectively but wants to receive all notifications from the mobile device 200, the head unit device 100 sets the value of the NotiAppList argument to "*" (a default value).

Table 16 lists arguments of a GetNotiConfiguration action invoked for the head unit device 100 to receive a value set by the SetNotiConfiguration action or a value set and stored by the mobile device 200.

TABLE 16

| Argument | Direction | relatedStateVariable |
| --- | --- | --- |
| ProfileID | IN | A_ARG_TYPE_ProfileID |
| NotiAppList | OUT | A_ARG_TYPE_NotiAppList |
| MinPriority | OUT | A_ARG_TYPE_String |

Upon the completion of settings for the notification by the SetNotiConfiguration action, the head unit device 100 subscribes in order to receive a notification from the mobile device 200. The subscription operation can be performed at any time after the head unit device 100 discovers the mobile device 200. Thereafter, the head unit device 100 receives notification event information from the mobile device 200.

In step S1050, the head unit device 100 transmits a subscription message requesting subscription to an ML notification service to the mobile device 200.

The mobile device 200 transmits to the head unit device 100 a notification event message including event notification information, only when an event notification occurs regarding the user-selected notification types in step S1055.

According to the present invention, notifications regarding an incoming/outgoing call, a new message, a device status alarm at a specific danger level, etc. can be transmitted unidirectionally or bidirectionally between a head unit device and a mobile device in an in-vehicle environment. Therefore, user convenience is increased.

In the foregoing embodiments of the present invention, modules may be devices.

The embodiments of the present invention can be implemented in hardware, software, or a combination of hardware and software. The software can be recorded to a volatile or non-volatile storage device such as a ROM irrespective of whether they are deletable or re-recordable, to a memory such as a RAM, a memory chip, a memory device, or an integrated circuit, or to a storage medium that is optically or magnetically recordable and readable by a machine (e.g. a computer), such as a CD, a DVD, a magnetic disk, or a magnetic tape. The memory included in the mobile device or the head unit device is an example of a machine-readable storage medium suitable for storing a program or programs including instructions to implement the embodiments of the present invention. Accordingly, the present invention includes a program including a code for implementing the method as appended in the claims and a machine-readable storage medium that stores the program. The program may be transferred electronically through any medium such as a communication signal transmitted through a wired or wireless connection and the present invention embraces equivalents thereof.

Moreover, the mobile device or the head unit device receives and stores the program from a program providing device connected to the mobile device or the head unit device in a wired or wireless manner. The program providing device includes a memory for storing instructions to perform a predetermined in-vehicle notification service method for the mobile device or the head unit device and information needed for the in-vehicle notification service method, a communication module for communicating with the mobile device or the head unit device wirelessly or by cable, and a controller for transmitting a corresponding program to the mobile device or the head unit device upon request or automatically.

While the present invention has been particularly shown and described with reference to embodiments thereof, it will be understood by those of ordinary skill in the art that various changes in form and details may be made therein without departing from the spirit and scope of the present invention as defined by the following claims and their equivalents.

What is claimed is:

1. A method for providing an in-vehicle notification service on a head unit device by the head unit device, the method comprising:
   receiving, from a mobile device by the head unit device, a first message including a list of identifiers of applications supporting the in-vehicle notification service;
   receiving, from the mobile device by the head unit device, a notification message including event information regarding an event occurring in the mobile device, in response to occurrence of the event of a respective application;
   transmitting, to the mobile device by the head unit device, a second message including an identifier of an application related to the event in the list of the identifiers of the applications, based on receiving of the notification message; and
   displaying, by the head unit device, a User Interface (UI) of the application related to the event, based on a response to the second message,
   wherein the event information includes the identifier of the application related to the event from among the applications.

2. The method of claim 1, further comprising:
   receiving a user input on the UI; and
   requesting an action corresponding to the user input to be performed by the mobile device.

3. The method of claim 1, further comprising:
   establishing a media session between the mobile device and the head unit device, based on the response to the second message,
   wherein the UI is received from the mobile device through the media session.

4. The method of claim 3, wherein establishing the media session comprises:
   obtaining, from the response to the second message, an address of a server module for the media session in the mobile device; and
   accessing the server module using the address by a client module of the head unit device.

5. The method of claim 1, further comprising:
   displaying notification types that the user can be notified about; and
   registering a notification type selected by the user from among the notification types to the mobile device.

6. The method of claim 1, further comprising:
   displaying the list of the identifiers of the applications to the user; and
   registering an application selected from among the applications supporting the in-vehicle notification service by the user to the mobile device.

7. The method of claim 1, further comprising requesting the mobile device to terminate the executed application.

8. The method of claim 1,
   wherein the second message requests the mobile device to execute the application related to the event in the mobile device.

9. The method of claim 1, further comprising:
   transmitting, to the mobile device by the head unit device, a third message requesting the list of the identifiers of the applications.

10. A non-transitory computer-readable recording medium having recorded thereon a computer program for executing a method of providing an in-vehicle notification service on a head unit device by the head unit device, the method comprising:
    receiving, from a mobile device by the head unit device, a first message including a list of identifiers of applications supporting the in-vehicle notification service;
    receiving, from the mobile device by the head unit device, a notification message including event information regarding an event occurring in the mobile device, in response to occurrence of the event of a respective application;
    transmitting, to the mobile device by the head unit device, a second message including an identifier of an application related to the event in the list of the identifiers of the applications, based on the receiving of the notification message; and
    displaying, by the head unit device, a User Interface (UI) of the application related to the event, based on a response to the second message.
    wherein the event information includes the identifier of the application related to the event from among the applications.

11. The non-transitory computer-readable recording medium of claim 10,
    wherein the second message requests the mobile device to execute the application related to the event in the mobile device.

12. The non-transitory computer-readable recording medium of claim 10, the method further comprising:
    transmitting, to the mobile device by the head unit device, a third message requesting the list of the identifiers of the applications.

13. A mobile device for providing an in-vehicle notification service, the mobile device comprising:
    a communication module for communicating with a head unit device; and
    a controller for:
    transmitting, to the head unit device, a first message including a list of identifiers of applications supporting the in-vehicle notification service;
    identifying a notification message including event information about an event occurring in the mobile device, in response to occurrence of the event of a respective application; and
    transmitting the notification message to the head unit device through the communication module;
    receiving, from the head unit device, a second message including an identifier of an application related to the event in the list of the identifiers of the applications; and
    transmitting, to the head unit device, a User Interface (UI) of the application related to the event, which is executed in the mobile device,
    wherein the event information includes the identifier of the application related to the event from among the applications.

14. The mobile device of claim 13, wherein the controller establishes a media session between the mobile device and the head unit device, and the UI is transmitted to the head unit device using the media session.

15. The mobile device of claim 14, wherein the controller transmits a response to the second message including an address of a server module for the media session to the head unit device through the communication module, and the server module is connected to a client module of the head unit device.

16. The mobile device of claim 13, wherein the controller receives a request to terminate the executed application from the head unit device through the communication module and terminates the application in response to the request.

17. The mobile device of claim 13, wherein
the second message requests the mobile device to execute the application related to the event in the mobile device.

18. The mobile device of claim 13, wherein the controller is configured for receiving a third message requesting the list of the identifiers of the applications from the head unit device.

19. A non-transitory computer-readable recording medium having recorded thereon a computer program for executing a method of providing an in-vehicle notification service on a head unit device by a mobile device, the method comprising;
transmitting, to the head unit device, a first message including a list of identifiers of applications supporting the in-vehicle notification service;
identifying a notification message including event information about an event occurring in the mobile device, in response to occurrence of the event of a respective application; and
transmitting, by the mobile device, the notification message to the head unit device;
receiving, from the head unit device, a second message including an identifier of an application related to the event in the list of the identifiers of the applications; and
transmitting, to the head unit device, a User Interface (UI) of the application related to the event, which is executed in the mobile device,
wherein the event information includes the identifier of the application related to the event from among the applications.

20. The non-transitory computer-readable recording medium of claim 19, wherein the second
message requests the mobile device to execute the application related to the event in the mobile device.

* * * * *